L. F. KALTWASSER.
SANITARY DISPLAY AND COVER ATTACHMENT FOR BARRELS, CASKS, OR OTHER RECEPTACLES.
APPLICATION FILED NOV. 9, 1908.

920,579.

Patented May 4, 1909.

Witnesses
O. F. Nagle.
H. S. Dieterich

Inventor:
Louis F. Kaltwasser.
By Wiedersheim & Fairbanks
Attorneys

UNITED STATES PATENT OFFICE.

LOUIS F. KALTWASSER, OF BELLEVILLE, ILLINOIS.

SANITARY DISPLAY AND COVER ATTACHMENT FOR BARRELS, CASKS, OR OTHER RECEPTACLES.

No. 920,579.	Specification of Letters Patent.	Patented May 4, 1909.

Application filed November 9, 1908. Serial No. 461,662.

*To all whom it may concern:*

Be it known that I, LOUIS F. KALTWASSER, a citizen of the United States, residing at Belleville, county of St. Clair, State of Illinois, have invented a new and useful Sanitary Display and Cover Attachment for Barrels, Casks, or other Receptacles, of which the following is a specification.

My invention consists of improvements in a sanitary display and cover attachment for a barrel, cask or other receptacle, embodying a transparent vessel of novel construction, and a head adapted to be connected with said receptacle and communicate with the interior thereof, while also serving to support said vessel and permit it to cover and uncover said head, said vessel permitting goods in the vessel to be viewed and inspected, while avoiding handling of the goods in the receptacle and preventing access of dust, dirt and disease-spreading germs to the goods in either case, other details being presented, as will be hereinafter described.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1:
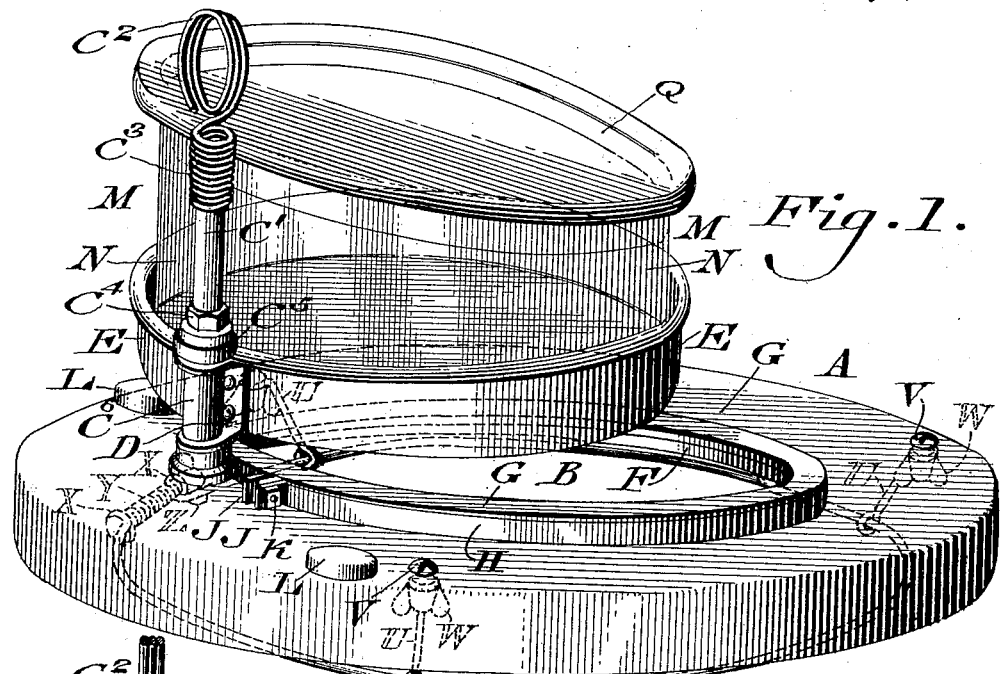
Figure 2:
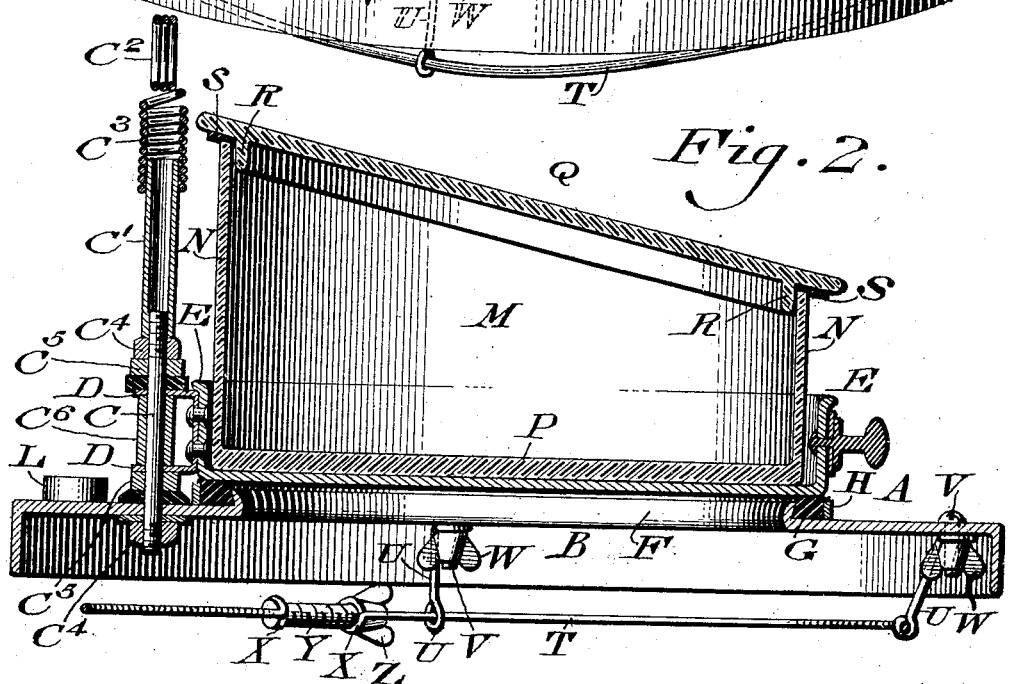

Figure 1 represents a perspective view of an attachment embodying my invention. Fig. 2 represents a transverse vertical section thereof.

Similar letters of reference indicate corresponding parts in the figures.

Referring to the drawings:—A designates a head, which is adapted to be fitted on the top of a barrel or other receptacle and having centrally therein an opening B, through which access may be had to the contents of said receptacle. Rising from and firmly connected with said head is the post C, on which is mounted the angularly-shaped ears D, to whose vertical side member is riveted or otherwise secured the pan E, which extends over the opening B of the head A, so as to cover the same, when in normal position, as shown in Fig. 2, and is adapted to be moved laterally, so as to uncover said opening, as shown in Fig. 1.

The wall of the opening B comprises a vertical rim F, which rises from the top of the head A and is encircled by the gasket G, which forms a cushion on which the pan E is seated, so that the latter rests easily in position and rides similarly when moved to the right or left for opening purposes. In order to retain the gasket in position, it is clamped by the divided band H, whose ends have ears J thereon, said ears receiving the screw K, on which latter is a suitable nut, the effect of which is evident. On the head A are plugs L of soft rubber or other resilient or pliable material, the same forming supports for the pan E in either right or left position, so as to prevent the same from sagging, while relieving the ear D of downward strain while the pan is in either position.

In the pan E is placed the jar or vessel M, the same being adapted to display goods of a nature of those in the barrel or receptacle, without necessarily uncovering the latter to inspect such goods, the body of the jar being formed of the side N and bottom P of glass or other transparent material and integral so as to avoid the entrance of dust or insects through the joint of said bottom and side, said body having a lid Q likewise formed of glass or other transparent material, so that the contents of the receptacle may be viewed through the side N and lid Q. The upper edge of the body of the jar is sloping and the lid Q set thereon in similar condition, so that by the inclination of said lid, the best results of seeing through the same is attained.

In order to hold the lid in position, its underside has depending therefrom the flange R, which is adapted to enter the top of the jar M, and so prevent the lid from slipping, it being noticed that the flange R is truly perpendicular, and so accords with the perpendicular side of the body of the jar, even while the lid itself is sloping or inclined, as has been stated. Packing S is interposed between the underside of the lid and top edge of the body of the jar for evident purposes.

In order to secure the head A to the barrel, I employ the divided ring or band T, which is suspended from the underside of the head A by the hangers U, the latter being connected with the head by the screws V thereon, said screws having tightening nuts W, which retain the hangers on said screws. The ends of the bands are formed with eyes X, through which is received the screw Y, to whose threaded end is fitted the thumb nut Z, whereby while the ring is adjustable to barrels or receptacles of different diameters, it may be drawn tightly on the receptacle to which it is applied, whereby the head may be retained in position thereon.

Mounted on a sleeve C' on the upper end of the post C, is the holder C² for a card or other object of descriptive matter, such as prices, nature of the goods, advertisements, etc. In practice, the holder C² and its attaching collar C³ are formed of coils of wire continuous of each other. The post C is firmly held in position on the head A by nuts C⁴ and washers C⁵, while the horizontal limbs of the ear D whose openings receive said post, thus mounting the ear on the latter, are held apart and nicely sustained by the sleeve C⁶, which is interposed between said limbs and mounted also on said post.

The contents of the barrel or other receptacle are accessible when the holder E is moved to the right or left, thereby uncovering the opening B, but when said holder is in normal position, said opening is covered, whereby dust, etc. cannot enter the receptacle, and handling of the goods in the latter is prevented, but the goods in the vessel M remain displayed under all circumstances, so that opening of the barrel, etc. is not necessary for inspection of the goods.

The vessel M remains nicely in position owing to the rim of the pan E, but it may be readily removed therefrom for purposes of cleansing, etc. In some instances, I may form said vessel of earthenware, metal or any suitable material other than transparent, while the lid Q alone is transparent so as to be able to view and inspect the contents of said vessel through the same.

Having thus described my invention, what I claim as new and desire to secure by Letters Patent, is:—

1. A head applicable to a receptacle, and having a substantially centrally disposed opening therein permitting access to said receptacle, a transparent vessel for displaying goods therein, a holder for said vessel pivotally mounted to one side of said opening to move laterally thereover adapted to cover and uncover the opening in the head, a standard secured to said head to one side of said opening, and an ear connected with said holder and pivotally mounted on said standard.

2. A head applicable to a receptacle, and having an opening therein, a display vessel, and a holder therefor above said opening, means for pivotally mounting said holder on said head and permitting lateral motions thereof to cover and uncover said opening, a cushion on the head around the wall of said opening, and means embracing said cushion and clamping it in position said holder being adapted to rest and ride on said cushion.

3. A head applicable to a receptacle and having an opening therein, a pivotally mounted holder seated over said opening, a cushion on the head around the opening on which said holder is adapted to rest and ride, and means clamping said cushion around said opening means on the under side of said head for clamping it to a receptacle.

4. A head applicable to a receptacle and having an opening therein, a cushion on said head around said opening a ring adapted to clamp said receptacle, adjustable means for connecting said ring to said head, and means for adjusting the diameter of said ring.

5. In a display vessel, a holder therefor, a standard on which said vessel is pivotally mounted, a head adapted to support said standard, and a card-holder on said standard independent of said holder and vessel.

6. A covering head, a display vessel thereover, a standard rising from said head, means for firmly connecting said standard with said head, means for pivotally mounting said vessel on said standard, and an upward extension on said standard forming a carrier for a card holding device.

7. In a display vessel, a head, a standard, a holder pivotally mounted on said standard, a sleeve mounted on the upper end of said standard and a yielding attaching collar frictionally held upon said sleeve and terminating in a card holder disconnected from the pivotally mounted holder.

8. In a display vessel, a head, a standard, a holder pivotally mounted on said standard, a sleeve mounted on the upper end of said standard and a yielding attaching collar frictionally held upon said sleeve and terminating in a card holder disposed at an angle to said collar and disconnected from the pivotally mounted holder.

9. In a display device, a head having a substantially centrally disposed opening, a gasket surrounding said opening, means for holding the gasket about the opening, and a pivotally mounted holder having an upwardly extended surrounding flange for holding the vessel and constructed to cover and uncover said opening and move upon said gasket.

10. In a display device, a head having a substantially centrally disposed opening, a gasket surrounding said opening, means for holding the gasket about the opening, a pivotally mounted holder constructed to cover and uncover said opening and move upon said gasket, and resilient supports for said holder upon opposite sides of said opening.

11. In a display device of the character stated, applicable to a receptacle, a head having an opening therein permitting access to said receptacle, a display vessel, a pan adapted to support said vessel in various positions over said head, a post rising from said head, an angular ear having its vertical side secured to said pan and provided in its horizontal limb with an opening adapted to receive said post, and means for sustaining said limb in position on said post and permitting lateral motions of said pan thereon.

12. In a display device of the character stated, applicable to a receptacle, a head, screws engaged in the under side thereof, nuts engaging said screws, hangers retained by said screws and nuts, a divided band supported in said hangers, and means joining the ends of said band for adjusting the diameter thereof.

LOUIS F. KALTWASSER.

Witnesses:
W. F. KIRCHER,
LOUIS SCHLERNITZAUER.